United States Patent
Shaffer et al.

(10) Patent No.: US 7,860,070 B2
(45) Date of Patent: Dec. 28, 2010

(54) PROVIDING MULTIPLE VIRTUAL TALK GROUP COMMUNICATION SESSIONS

(75) Inventors: Shmuel Shaffer, Palo Alto, CA (US); Steven L. Christenson, Campbell, CA (US); Douglas J. Hall, Westerville, OH (US); Larry R. Metzger, Wake Forest, NC (US); Amit P. Barave, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 1267 days.

(21) Appl. No.: 11/382,496

(22) Filed: May 10, 2006

(65) Prior Publication Data
US 2007/0274460 A1   Nov. 29, 2007

(51) Int. Cl.
*H04W 4/00*   (2009.01)
*H04B 7/00*   (2006.01)

(52) U.S. Cl. .................... 370/338; 370/395.5; 455/519; 455/456.1

(58) Field of Classification Search ................. 455/517, 455/518, 519, 520, 521, 456.1, 456.3; 370/338, 370/352, 395.5, 395.52, 401
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 5,048,082 A | 9/1991 | Krafft et al. | 379/406.07 |
| 5,099,510 A | 3/1992 | Blinken et al. | 379/202.01 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |

(Continued)

FOREIGN PATENT DOCUMENTS

WO   WO 01/91485   11/2001

(Continued)

OTHER PUBLICATIONS

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

(Continued)

*Primary Examiner*—Quochien B Vuong
(74) *Attorney, Agent, or Firm*—Baker Botts L.L.P.

(57) ABSTRACT

Providing virtual talk groups to an endpoint includes managing the virtual talk groups, where a virtual talk group comprises one or more members operable to participate in the virtual talk group. One or more overlapping members are identified, where an overlapping member is a member of more than one virtual talk group. Internal virtual talk groups are generated from the original virtual talk groups, where the internal virtual talk groups comprise at least a reduced number of overlapping members. One or more original virtual talk groups are provided to the endpoint using the internal virtual talk groups.

37 Claims, 3 Drawing Sheets

U.S. PATENT DOCUMENTS

| | | | |
|---|---|---|---|
| 6,400,816 B1 | 6/2002 | Hjalmtysson et al. | 379/201.03 |
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,792,092 B1 | 9/2004 | Michalewicz | 379/202 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Lelvine et al. | 379/88.23 |
| 7,058,168 B1 | 6/2006 | Knappe et al. | 379/204.01 |
| 7,079,857 B2 | 7/2006 | Maggenti et al. | 455/518 |
| 2001/0028321 A1 | 10/2001 | Krasner | 342/357.1 |
| 2002/0013813 A1 | 1/2002 | Matsuoka | 709/204 |
| 2002/0152305 A1 | 10/2002 | Jackson et al. | 709/224 |
| 2002/0178364 A1 | 11/2002 | Weiss | 713/182 |
| 2003/0100326 A1 | 5/2003 | Grube et al. | 455/515 |
| 2004/0054428 A1 | 3/2004 | Sheha et al. | 700/56 |
| 2004/0070515 A1 | 4/2004 | Burkley et al. | 340/825.49 |
| 2004/0139320 A1 | 7/2004 | Shinohara | 713/168 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0135348 A1 | 6/2005 | Staack | 370/353 |
| 2005/0174991 A1 | 8/2005 | Keagy | 370/352 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2007/0030144 A1 | 2/2007 | Titus et al. | 340/534 |
| 2007/0060144 A1 | 3/2007 | Mills et al. | 455/445 |
| 2007/0115848 A1 | 5/2007 | Chean et al. | 370/252 |
| 2008/0037461 A1 | 2/2008 | Biltz et al. | 370/328 |
| 2008/0167049 A1 | 7/2008 | Karr et al. | 455/456 |

FOREIGN PATENT DOCUMENTS

| | | |
|---|---|---|
| WO | WO 02/074051 | 9/2002 |

OTHER PUBLICATIONS

Network Solution:, Information Sheet, NetworkFirst, M/A-COM, Inc., http://www.networkfirst.com/features/solution, 2 pages, 2003.

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.rdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power.

Jim McKay, *Government Technology*, "Intact Amid Chaos", Mar. 2005, 2 pages.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies.

MRT Urgent Communications: Service, Safety, Security, John Facella, "ROIP Success Is in the Details," Dec. 1, 2004, 3 pages. http://mrtmag.com/mag/radio_roip_success_details/.

Ann Imse, *Rocky Mountain News*, "Radio Breakthrough for Cops, Firefighters," Dec. 10, 2004, 2 pgs.

*First Responder Communications*, A Supplement to MRT and Fire Chief, "IP Opens Eyes," Aug. 2004, 5 pages.

*MRT, Mobile Radio Technology*, "IP Evangelist," Apr., 2004, 4 pages, www.iwce-mrt.com.

Ron Bender, et al., *MRT; Mobile Radio Technology* "Multiple Choices for Critical Communications," Oct. 2001, 4 pages, www.mrtmag.com.

Jay Herther, et al., *MRT; Mobile Radio Technology*, "Voice-over-Interintranet Protocol for Critical Communications," Aug. 2001, 4 pages, www.mrtmag.com.

*What's New in Radio Communications*, Aug./Sep. 2001, vol. 14 No. 1, Inside: Marine Radio, 2 pages, www.westwick-farrow.com.au.

Cisco IP Interoperability and Collaboration System, Q&A, Copyright © Cisco Systems, Inc. www.cisco.com, 4 pages, Printed Mar. 2006.

Cisco IPICS, Solution Overview, Copyright © Cisco Systems, Inc., www.cisco.com/go/ipics, 6 pages, Printed Mar. 2006.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005.

Matthews, et al., A New Interoperability Paradigm A Concept Proposal, Mar. 2006, *Worcester Polytechnic Institute, WPI Bioengineering Institute*, 15 pages.

U.S. Appl. No. 11/149,041 entitled, "*Method and System for Communicating Using Position Information*," inventors Shmuel (nmi) Shaffer et al., Jun. 8, 2005.

U.S. Appl. No. 11/201,832, entitled, "*Method and System for Automatic Configuration of Virtual Talk Groups Based on Location of Media Source*," inventors Shmuel (nmi) Shaffer et al., Aug. 10, 2005.

U.S. Appl. No. 11/202,400, entitled, "*Method and System for Communicating Media Based on Location of Media Source*," inventors Shmuel (nmi) Shaffer et al., Aug. 10, 2005.

U.S. Appl. No. 11/202,403, entitled, "*Method and System for Providing Interoperable Communications With Location Information*," inventors Shmuel (nmi) Shaffer, et al., Aug. 10, 2005.

U.S. Appl. No. 11/214,582, entitled, "*Method and System for Conveying Media Source Location Information*," inventors Shmuel (nmi) Shaffer et al., Aug. 29, 2005.

U.S. Appl. No. 11/364,146, entitled, "*Method and System for Providing Interoperable Communications with Congestion Management*," inventors Shmuel (nmi) Shaffer et al., Feb. 27, 2006.

U.S. Appl. No. 11/365,113, entitled, *"Method and System for Providing Interoperable Communications with Dynamic Event Area Allocation,"* inventors Shmuel (nmi) Shaffer et al., Feb. 28, 2006.

U.S. Appl. No. 11/399,031, entitled, *"Method and System for Managing Virtual Talk Groups,"* inventors Shmuel (nmi) Shaffer et al., Apr. 5, 2006.

U.S. Appl. No. 11/383,998, entitled, *"Providing Virtual Talk Group Communication Sessions in Accordance with Endpoint Resources,"* inventors Kalley, et al., May 18, 2006.

Shaffer, et al., U.S. Appl. No. 11/421,994, filed Jun. 2, 2006, *Method and System for Joining a Virtual Talk Group*.

Shaffer, et al., U.S. Appl. No. 11/421,999, filed Jun. 2, 2006, *Method and System for Managing a Plurality of Virtual Talk Groups*.

Shaffer, et al., U.S. Appl. No. 11/617,019, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.

Shaffer, et al., U.S. Appl. No. 11/550,234, filed Oct. 17, 2006, *Method and System for Providing an Indication of a Communication*.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

PCT International Search Report and Written Opinion (ISA/US) for PCT/US06/19227; 7 pages, Sep. 4, 2007.

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161).

US 7,860,070 B2

PROVIDING MULTIPLE VIRTUAL TALK GROUP COMMUNICATION SESSIONS

TECHNICAL FIELD OF THE INVENTION

This invention relates in general to communication systems and, more particularly, to a method and system for providing multiple virtual talk group communication sessions.

BACKGROUND OF THE INVENTION

Public and private groups such as groups of security and safety personnel (for example, police officers, fire fighters, and emergency medical technicians) may need to communicate with each other. These groups, however, may utilize endpoints and communication networks that use different technologies. For example, safety personnel may utilize land mobile radios communicating using push-to-talk technologies, while police dispatchers may utilize personal computers communicating using wired network technologies.

Interoperability solutions attempt to provide communications among different endpoints and different networks. Organizations working towards interoperability solutions include JPS COMMUNICATIONS of RAYTHEON CORPORATION, IP BLUE SOFTWARE SOLUTIONS, TWISTED PAIR SOLUTIONS, INC., M/A-COM, INC., MOTOROLA, INC., and CISCO SYSTEMS, INC.

Communications among different endpoints and different networks, however, may be difficult. Collaboration between the different groups and networks tends to be ad hoc and inefficient, and often involves laborious manual intervention.

SUMMARY OF THE INVENTION

The present invention provides a method and system for providing virtual talk group communication sessions that substantially reduce or eliminate at least some of the disadvantages and problems associated with previous methods and systems.

In accordance with a particular embodiment, providing virtual talk groups to an endpoint includes managing the virtual talk groups, where a virtual talk group comprises one or more members operable to participate in the virtual talk group. One or more overlapping members are identified, where an overlapping member is a member of more than one virtual talk group. Internal virtual talk groups are generated from the original virtual talk groups, where the internal virtual talk groups comprise at least a reduced number of overlapping members. One or more original virtual talk groups are provided to the endpoint using the internal virtual talk groups.

In accordance with another embodiment, facilitating virtual talk groups includes receiving streams from sources of members of one or more virtual talk groups. Two or more streams received from a common source are identified. A subset of the identified streams is dropped. The remaining streams are mixed.

In accordance with another embodiment, managing virtual talk groups includes accessing information describing one or more links among virtual talk groups, where at least some of the virtual talk groups are linked by the one or more links. A link between a first virtual talk group and a second virtual talk group is considered. Whether the considered link would yield a loop among at least a subset of the virtual talk groups is determined. A response is performed if the considered link would yield the loop.

Certain embodiments of the invention may provide one or more technical advantages. A technical advantage of one embodiment may be that internal virtual talk groups that avoid overlapping members, that is, members of two or more virtual talk groups, may be created. An endpoint may use the internal virtual talk groups to avoid receiving streams from a common source, which may in turn avoid undesired echo resulting from mixing streams from a common source.

Another technical advantage of one embodiment may be that an endpoint may identify streams arriving from a common source, and may drop all but one of the streams. The endpoint may identify the streams according to a cross-correlation matrix, a speech recognition operation, or the headers of packets carrying the streams.

Another technical advantage of one embodiment may be that a user interface for creating and managing virtual talk groups may be used to reduce or eliminate the possibility of creating loops through which a stream originating from an endpoint travels back to the endpoint. A stream traveling through the loop may create undesired feedback noise.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
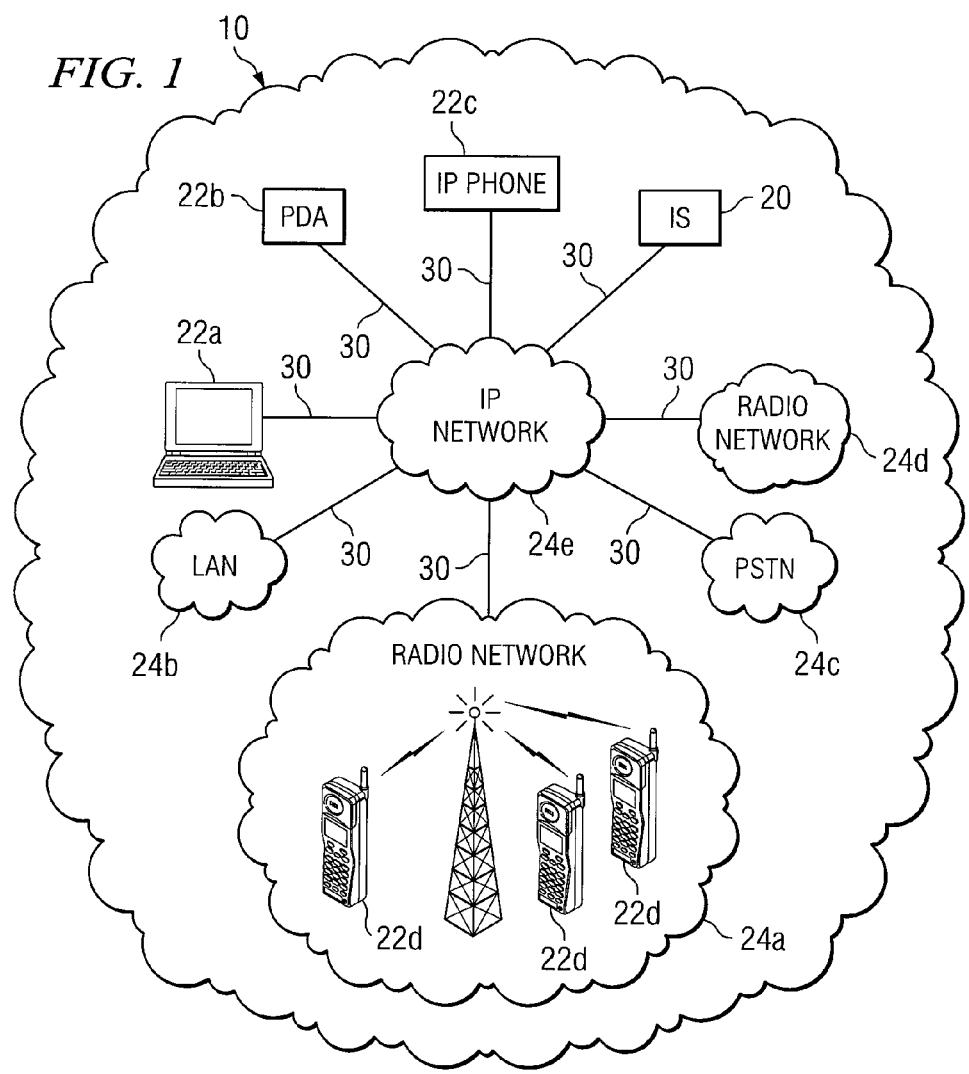
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, an interoperability system (IS) 20, and endpoints 22a-22d. IS 20 is able to facilitate interoperable communication sessions between and among various communication devices, such as endpoints 22. IS 20 may use a systems approach to offer a framework based on Internet Protocol (IP) protocols and services in order to provide secure voice, video, and other data interoperability among endpoints 22 and networks 24 utilizing different technologies.

According to one embodiment, communication system 10 may allow an endpoint 22 to participate in one or more virtual talk groups. A virtual talk group may allow member endpoints 22 to interoperably communicate over a virtual channel. In certain situations, participation in two or more virtual talk groups may result in an endpoint 22 sending another endpoint 22 two or more streams that are out of phase. If out of phase streams from the same endpoint 22 are mixed, the resulting mixed stream may yield an undesired echo.

System 10 may have features that may be used to address this situation. In a first example, IS 20 may detect whether an endpoint 22 is an overlapping member, that is, a member of two or more virtual talk groups. IS 20 may create internal virtual talk groups that avoid overlapping members. Endpoints 22 may listen to the internal talk groups to avoid mixing streams from a common source. In a second example, an endpoint 22 may identify streams received from a common source, and may drop all but one of the streams.

According to one embodiment, a user interface for creating and managing virtual talk groups may be used to reduce or eliminate the possibility of creating loops through which a stream originating from an endpoint 22 travels back to the endpoint 22. A stream traveling through the loop may create undesired feedback noise.

According to the illustrated embodiment, communication system 10 operates to allow endpoints 22 to participate in one or more communication sessions. A communication session may refer to an active communication among two or more endpoints 22. As an example, a communication session may occur between an endpoint 22 and another endpoint 22, or between an endpoint 22 and a defined set of other endpoints 22. Information is communicated during a communication session. Information may refer to voice, data, text, audio, video, multimedia, control, signaling, IM, other information, or any combination of the preceding.

Communication system 10 includes communication networks 24a-24e. Communication networks 24 may be distributed locally or across multiple cities or other geographic regions. A communication network 24 may comprise any suitable IP or non-IP communication network of any wireless or wireline form.

A communication network 24 may comprise at least a portion of one or more of the following: a public switched telephone network (PSTN), a public or private data network, a local area network (LAN), a metropolitan area network (MAN), a wide area network (WAN), a local, a cellular network, regional, or global communication or computer network such as the Internet, a wireline or wireless network, an enterprise intranet, a land mobile radios (LMR) network, a Code Division Multiple Access (CDMA) network, a Time Division Multiple Access (TDMA) network, a Global System for Mobile Communications (GSM) network, a satellite network, other suitable network, or any combination of the preceding.

A communication network 24 may utilize communication protocols and technologies to provide the communication sessions. Example communication protocols and technologies include those set by the Institute of Electrical and Electronics Engineers, Inc. (IEEE) 802.xx, the International Telecommunications Union (ITU-T) standards, the European Telecommunications Standards Institute (ETSI) standards, the Internet Engineering Task Force (IETF) standards, or other standards.

As an example, a communication network 24 may communicate data in streams of packets according to a packet technology for example, Internet Protocol (IP) technology. A packet technology may allow for the addressing or identification of endpoints, nodes, and/or other devices of or coupled to the communication network 24. For example, each device coupled to an IP network may be identified using IP addresses. In this manner, the communication network 24 may support any form and/or combination of point-to-point, multicast, unicast, or other techniques for exchanging media packets among components of communication system 10.

As another example, a communication network 24 may receive and transmit data in a Session Initiation Protocol (SIP) environment. SIP is an application-layer control protocol that includes primitives for establishing, modifying, and terminating communication sessions. SIP works independently of underlying transport protocols and of the type of session that is being established. SIP also transparently supports name mapping and redirection services, which support personal mobility.

Communication system 10 may comprise any suitable number of any suitable communication networks 24. In the illustrated embodiment, communication networks 24a and 24d comprise radio networks (RNs), communication network 24b comprises a LAN, communication network 24c comprises a PSTN, and communication network 24e comprises an IP network.

Radio networks 24a and 24d may support communication among mobile endpoints, such as land mobile radios (LMRs), using any suitable communication methods or features, such as cellular or push-to-talk (PTT). PSTN 24c may include switching stations, central offices, mobile telephone switching offices, pager switching offices, remote terminals, other related telecommunications equipment, or any combination of any of the preceding.

Communication network 24b may communicate signals transmitted to telephony devices located on different, but interconnected, IP networks. Communication network 24b may also be coupled to non-IP telecommunication networks through, for example, the use of interfaces or components, including gateways. In one embodiment, communication network 24b may be coupled with PSTN 24c through a gateway, which may be a part of IS 20 or network 24e.

Communication networks 24 may comprise networks of particular public and private groups such as agencies or companies. For example, communication networks 24 may comprise networks for security and safety personnel (for example, police officers, fire fighters, or emergency medical technicians) or for a particular company. Communication networks 24 may be operational with respect to a particular area or otherwise.

Communication networks 24 may include any number and combination of devices. In general, a device may include any suitable arrangement of components operable to perform the operations of the device, and may comprise logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations. For example, a processor may comprise a microprocessor, controller, or any other suitable computing device.

"Interface" may refer to logic of a device operable to receive input for the device, send output from the device, perform suitable processing of the input or output or both, or any combination of the preceding, and may comprise one or more ports, conversion software, or both. "Memory" may refer to volatile or non-volatile logic operable to store and facilitate retrieval of information, and may comprise Random Access Memory (RAM), Read Only Memory (ROM), optical media, magnetic media, a disk drive, a Compact Disk (CD) drive, a Digital Video Disk (DVD) drive, removable media, any other suitable local or remote data storage medium, or a combination of any of the preceding.

Communication networks 24 may include any suitable number of combinations of segments, nodes, and endpoints to enable communication. A node may comprise any suitable number of any suitable communication devices. One or more nodes of a communication network 24 may include network components, gatekeepers, call managers, conference bridges, routers, hubs, switches, gateways, base stations, endpoints, other devices that allow for the exchange of data in communication system 10, or any combination of any of the preceding.

Segments 30 couple networks 24, endpoints 22, and IS 20. Segments 30 may comprise any suitable wireless or wireline communication links, including one or more communication networks. In particular embodiments, segments 30 may include gateways for facilitating communication between various networks, such as an LMR gateway between radio network 24a and IP network 24e.

Endpoints 22 may represent any suitable device or system of devices operable to provide communication services to a user. Endpoints 22 may provide communication services by sending and receiving streams of packets.

An example endpoint 22 may comprise a telephone, a cellular phone, an IP phone, a personal digital assistant (PDA), a fax machine, a personal computer (PC), a sensor such as a camera or a video monitor, a land mobile radio (LMR), a command center, a gateway, any other communication device or system of devices, or any suitable combination of any of the preceding. In the illustrated embodiment, endpoints 22 comprise a PC (endpoint 22a), a PDA (endpoint 22b), an IP phone (endpoint 22c), and LMRs (endpoints 22d). Endpoints 22 and IS 20 may also include unattended or automated systems, gateways, or other devices that can establish media sessions.

Endpoints 22 may be IP or non-IP enabled. IP enabled endpoints 22 may comprise IP telephony devices capable of participating in IM, video, and other multimedia communication sessions. IP telephony devices have the ability to encapsulate user input (such as voice) into IP packets so that the input can be transmitted over a communication network. IP telephony devices may use Voice over IP (VoIP), or Voice over Packet (VoP), technology. Endpoints 22 may include endpoint devices running telephony software, other device capable of performing telephony functions, or any suitable combination of any of the preceding.

IS 20 enables, facilitates, and/or provides for interoperable communication among communication devices, such as endpoints 22, using IP. As indicated above, such network interoperability includes the interoperability of push-to-talk voice technology within various networks and the interoperability between push-to-talk and full duplex dialed connections.

IS 20 may map devices to IP addresses to allow the devices to communicate with other devices. As an example, IS 20 may control gateways of segments 30 to map radio frequencies of particular radio endpoints to IP addresses to allow the radio endpoints to communicate with each other. In some embodiments, IS 20 may host conferences that bridge communications received from endpoints.

Addresses may be assigned in any suitable manner. Multicast IP addresses may be assigned one or more endpoints of one or more communication networks. As an example, a group of endpoints may be combined into a virtual talk group (VTG) for communication using a particular IP address. The virtual talk group may be assigned a multicast IP address through which endpoints of the talk group may communicate.

IS 20 may communicate in other manners. As an example, IS 20 may communicate using a peer-to-peer dialed connection or a nailed dialed connection. Communication methods may be combined to facilitate communication among endpoints. For example, in some cases certain endpoints of a virtual talk group may participate in the talk group through a multicast IP address, while other endpoints may utilize a nailed SIP connection.

IS 20 may be utilized and implemented in any number of market segments, such as enterprise safety and security (for example, loss prevention), transportation, retail, public safety, and federal agencies in order to provide radio and non-radio network interoperability within and between such market segments.

Modifications, additions, or omissions may be made to communication system 10 without departing from the scope of the invention. The components of communication system 10 may be integrated or separated according to particular needs. Moreover, the operations of system 10 may be performed by more, fewer, or other modules. Additionally, operations of system 10 may be performed using any suitable logic.

Figure 2:
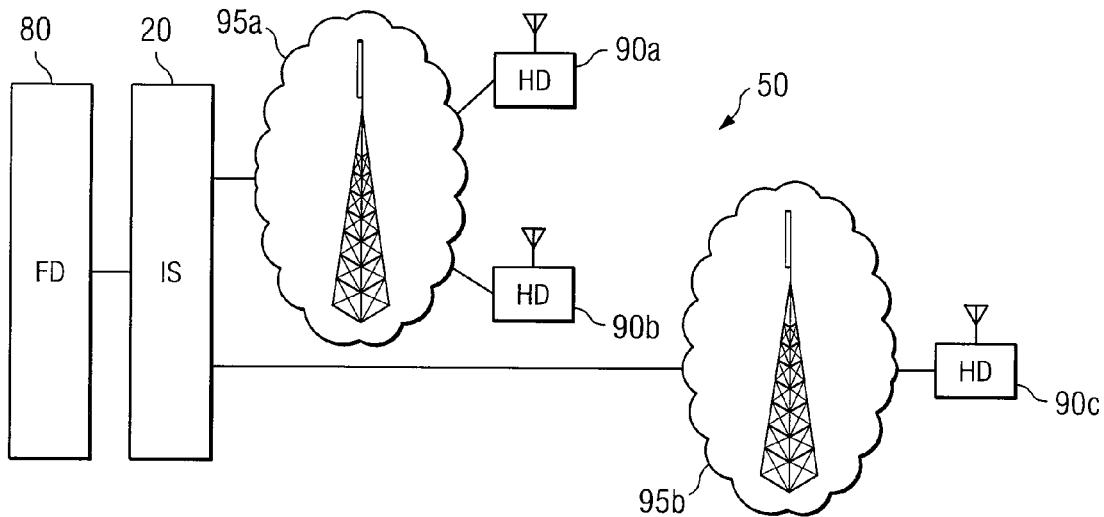
FIG. 2 illustrates a system for providing a push-to-talk communication session, in accordance with a particular embodiment.

FIG. 2 illustrates a communication system 50 for providing a push-to-talk communication session, in accordance with a particular embodiment. Communication system 50 includes a full duplex endpoint 80, one or more half-duplex endpoints 90a-c, one or more communication networks 95a-b, and an IS 20 coupled as shown.

Communication networks 95 allow for communication among endpoints 90, and may comprise, for example, land mobile radio networks of different public or private groups. Endpoints 80 and 90, however, may communicate with IS 20 through any of a variety of communication networks. In some cases, communications between endpoints 80 and 90 may not travel through IS 20, but may travel through gateways and other network components controlled by IS 20.

IS 20 may be substantially similar to the IS generally described with reference to FIG. 1. IS 20 may facilitate interoperable communication among endpoints 80 and 90, and is described in more detail with reference to FIG. 3. Endpoints 80 and 90 may be substantially similar to endpoints generally described with reference to FIG. 1. An example endpoint is described in more detail with reference to FIG. 4.

Endpoint 80 represents any suitable full duplex endpoint capable of communicating in a full duplex manner. A full duplex endpoint may receive and transmit communications at the same time using, for example, separate communication channels for incoming and outgoing communications. A channel may refer to a unidirectional or bidirectional path for transmitting and/or receiving electrical or electromagnetic signals and media streams. For example, a channel may comprise a conventional radio physical radio frequency (RF) channel. Example full duplex endpoints include a PSTN phone and a cellular phone. The communication may comprise any suitable media modality, for example, voice, data, text, video, IM, other media modality, or any suitable combination of the preceding.

Endpoints 90 represent any suitable half-duplex endpoint capable of communicating in a half-duplex manner. A half-duplex endpoint may only either transmit or receive communications at one time, as one communication channel is used for incoming and outgoing communications. An example half-duplex endpoint comprises a push-to-talk endpoint such as a push-to-talk land mobile radio. To communicate over the channel, a user may select a push-to-talk button by, for example, pushing the button. To end communication over the channel, the user may deselect the push-to-talk button by, for example, releasing the button.

According to one embodiment of operation, full duplex endpoint 80 calls into IS 20 in order to participate in a virtual talk group, which may include other full duplex endpoint 80 and half-duplex endpoints 90. IS 20 facilitates communication among the endpoints 80 and 90. For example, a multipoint conference system of IS 20 may bridge together transmissions from an endpoint 80 or 90 for communication to the other endpoints 80 or 90.

An endpoint 80 or 90 may "control the floor" in order to become an active endpoint and have its communications transmitted to and received by other endpoints 80 or 90. Otherwise, communication from endpoint 80 may not reach a half-duplex endpoint 90 that is currently sending a communication, and vice versa.

IS 20 may provide floor control through a mute function. An endpoint 80 or 90 that has floor control is allowed to communicate, and the other endpoints 80 or 90 are muted. As an example, when the endpoint 80 or 90 has floor control, communications from the endpoint 80 or 90 are transmitted to the other endpoints 80 or 90, which are muted. IS 20 prevents the other endpoints 80 or 90 from gaining floor control when the endpoint 80 or 90 has floor control. When the endpoint 80 or 90 does not have floor control, another endpoint 80 or 90 may gain floor control to send communications.

According to one embodiment, IS 20 may facilitate communication among endpoints of various networks through virtual talk groups. A talk group may comprise a defined set of users (for example, radio users) who share a common functional responsibility and typically coordinate actions amongst themselves without radio interface with other talk groups. For example, a municipality's police department network may include various talk groups of different users.

A virtual talk group may allow member endpoints of a talk group to interoperably communicate over a virtual channel. A virtual channel may comprise a virtual channel address through which member endpoints may access the virtual talk group and/or through which communications from member endpoints are bridged. As an example, a virtual channel address may comprise an IP address. A virtual talk group may have a virtual talk group identifier that uniquely identifies the virtual talk group.

A virtual talk group may have any suitable communications format. As a first example, endpoints of a virtual talk group may use a multicast address for access. As a second example, a virtual talk group may comprise multiple talk groups, such as multiple radio sources from different frequencies with mixed communications. As a third example, a virtual talk group may comprise a unicast group or a combination unicast and multicast group.

Virtual talk groups may be created using any suitable user/endpoint groups or channels based on location, organizational requirements, event requirements, or any other suitable characteristic. An example virtual talk group may comprise channels or other multicast paths used by endpoints of a police department's radio network, a fire department's radio network, a corporation's security radio network, and IP-enabled endpoints such as IP phones, IP-enabled PDAs, or PCs.

A virtual talk group may have any suitable members. Example members include users, endpoints, push-to-talk management clients, other virtual talk groups, or any combination of the preceding. As an example, a child virtual talk group may be linked to a parent virtual talk group to become a sub-group of the parent virtual talk group. The members of the linked virtual talk groups receive streams from both virtual talk groups. Virtual talk groups may be linked by patching the addresses of the virtual talk groups. For example, the addresses may be patched through voice port pair resources on a Cisco T1 interface card.

A problem may arise if linked virtual talk groups yield a loop through which a stream originating from an endpoint 80 or 90 enters into an infinite loop. A stream traveling through the loop may create undesired feedback noise. A loop may be created if a virtual talk group is both a child and a parent of itself. For example, a first virtual talk group may be linked to a second virtual talk group, the second virtual talk group may be linked to a third virtual talk group, and the third virtual talk group may be linked to the first virtual talk group, creating a loop where the first virtual talk group is both a child and a parent of itself.

According to one embodiment, a user interface for creating and managing virtual talk groups may be used to reduce or eliminate the possibility of creating loops. An example user interface is described in more detail with reference to FIGS. 5A and 5B.

A virtual talk group may be associated with one or more features. A feature may refer to a particular capability of the virtual talk group. Example features include, for example, recording information, playing information, other capability, or any combination of the preceding. Information may include, for example, voice, data, text, audio, video, multimedia, control, signaling, IM, other information, or any combination of the preceding, about a communication or a scene associated with an endpoint 80 or 90. The information may be presented in any of a variety of encoding formats, which may utilize different resources from the endpoint in order to receive information from and/or send information to other endpoints.

According to one embodiment, an endpoint 80 or 90 may participate in one or more virtual talk groups, such as two or more virtual talk groups. As an example, endpoint 90a may participate in a first, a second, and a third virtual talk group. When the first and second virtual talk groups are mixed into the third virtual talk group, the media stream from endpoint 90a is mixed twice into the third virtual talk group, once from the first virtual talk group and again from the second virtual talk group. The third virtual talk group receives media streams from endpoint 90a twice via two media streams, which may be out of phase with each other. For example, system delay variation, jitter buffer variation, or other variation may cause the streams to be received out of phase. If the out of phase streams from endpoint 90a are mixed, the resulting mixed stream may yield an undesired echo.

According to one embodiment, system 50 may have features that can be used to address this situation. According to one embodiment, IS 20 may detect whether an endpoint 80 or 90 is an overlapping member, that is, a member of two or more virtual talk groups that are combined into a larger third virtual talk group. IS 20 may then create internal virtual talk groups from the two or more virtual talk groups, where the endpoint 80 or 90 is not an overlapping member. IS 20 then instructs endpoints 80 or 90 to listen to the internal talk groups to avoid mixing multiple streams from the same endpoint 80 or 90 into a single virtual talk group.

According to another embodiment, endpoint 80 or 90 may detect whether input streams are arriving from the same source, and drop all but one of the streams. As an example, endpoint 80 or 90 may calculate a cross-correlation matrix that may be used to identify streams from the same endpoint 80 or 90. As another example, endpoint 80 or 90 may use a speech recognition operation, such as a speech envelope detection operation, to identify streams from the same endpoint 80 or 90. As yet another example, the system may examine the source address of the headers of the media stream IP packets to identify streams from the same source.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of system 50 may be performed using any suitable logic.

Figure 3:
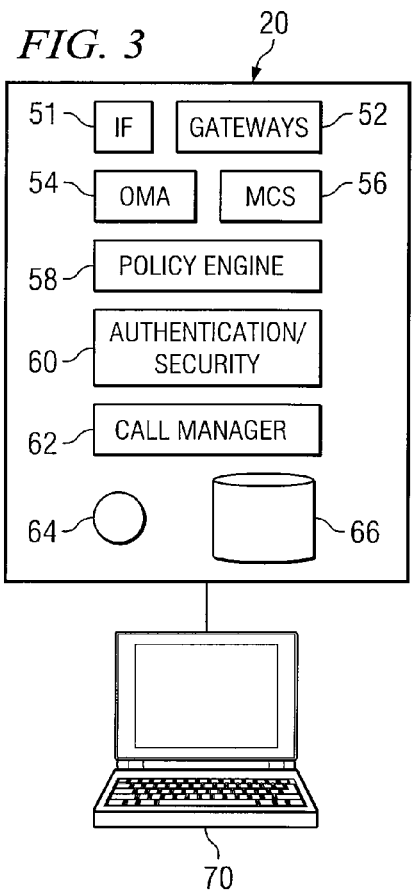
FIG. 3 illustrates an example interoperability system that may be used with the system of FIG. 2, in accordance with a particular embodiment.

FIG. 3 illustrates an IS 20, in accordance with a particular embodiment. IS 20 may be substantially similar to the IS of FIG. 1 or of FIG. 2. IS 20 may be used by any suitable person, such as a dispatcher, an administrator, or a first responder mobile user.

A control endpoint may refer to an endpoint utilized to access, configure, and control the functionality of IS 20. In one embodiment, a PC endpoint 70 may be used to access, configure, and control IS 20. PC endpoint 70 may run a client application for such access, configuration, and control. The client application may enable a user of endpoint 70 to receive and monitor communications from endpoints and virtual talk groups. Other suitable control endpoints, such as an IP phone, a PDA, or a mobile device, may be utilized to access, configure, and control IS 20.

In the illustrated embodiment, IS 20 includes an interface (I/F) 51, gateways 52, an operations management application (OMA) 54, a multipoint conference system (MCS) 56, a policy engine 58, an authentication and security system 60, a call manager 62, a processor 64, and a memory module 66.

Interface 51 facilitates the communication of information between IS 20 and other network components. For example, interface 51 may receive communications from endpoints. The communication may take place over IP networks, which may reduce the need for dedicated wiring between the endpoints and IS 20.

Gateways 52 may represent one or more gateways that provide network interoperability. Example gateways 52 include LMR gateways, PSTN gateways, or application gateways. Gateways 52 may provide mappings between IP services and interoperable networks, such as an LMR network. In some cases, gateways 52 may not be located within IS 20, but may be distributed throughout a communication system for enabling communications among communication networks.

Operations management application (OMA) 54 includes functionality for configuration, management, and control of IS 20. OMA 54 may provide conference and collaboration management. OMA 54 may simultaneously monitor and provide communication ability for any number of channels to allow a user to simultaneously communicate with and control multiple virtual talk groups. OMA 54 may also use authentication and security system 60 to authenticate a user and obtain user configuration information.

OMA 54 may be accessed by a user via a control endpoint, for example, PC endpoint 70 or a mobile endpoint. OMA 54 may allow a control endpoint to configure, manage, and simultaneously participate in one or more virtual talk groups and ad hoc conferences. In particular embodiments, OMA 54 may be accessed through a web interface functioning, for example, as a soft phone for a radio.

Multipoint conference system (MCS) 56 provides collaboration and conference services for multiple endpoints of one or more networks. For example, different types of endpoints of different networks may be bridged together through MCS 56 to provide virtual talk group communications. MCS 56 may include any suitable number or type of conference bridges, ports, digital signal processors, or other components to facilitate communications.

Policy engine 58 includes policies, such as pre-determined and ad hoc policies, specifying actions to take in response to events in order to provide dynamic incident management. In one embodiment, policy engine 58 may receive input from detectors such as alarms and sensors. Policy engine 58 may then set up communication interoperability and one-way information collaboration, and may trigger additional actions such as pager, e-mail, or other notifications, dial-outs, data recording, or information escalation.

Authentication and security system 60 manages access, configuration, and control privileges for users of IS 20 and endpoints 22. Different users may have different privileges. Some users may have only transmit or listen privileges with respect to one or more particular talk groups, while other users may have the ability to communicate with all talk groups or to setup and configure talk groups. User privileges may dynamically change in response to the occurrence of particular events.

Call manager 62 maintains information regarding users, such as the users of IP networks for which interoperable communications are provided by IS 20. The information may include a name or other identifier and contact information such as phone numbers and email addresses.

Processor 64 may comprise a processor operable to provide IS 20 functionality, either alone or in conjunction with other IS components such as OMA 54. Such functionality may include providing features discussed herein. Other features may include: providing location information of endpoints; enabling an endpoint to listen to and/or participate in communications involving endpoints of a particular geographic area; presenting communication of endpoints of scene-related virtual talk groups; and controlling gateways and other network components to facilitate interoperable communications among endpoints.

Memory module 66 may comprise memory operable to store any suitable information utilized by IS 20. In particular embodiments, information may include information for user management, virtual talk group management, resource pool management, privileges, backup configuration, and/or timestamp and activity tracking.

IS 20 may be used to facilitate communication among endpoints of a virtual talk group. MCS 56 may provide conferencing functionality for the endpoints. In particular embodiments, multiple talk groups may be patched together on a dynamic basis. In some cases, a virtual talk group may not necessarily include communications through IS 20, but may instead include member endpoints whose communications are mapped to IP addresses at gateways controlled by IS 20.

Modifications, additions, or omissions may be made to IS 20 without departing from the scope of the invention. For example, IS 20 may also include any number of switches, routers, firewalls, mobile access routers, access points, wireless bridges, or other components. The components of system IS 20 may be integrated or separated according to particular needs. Moreover, the operations of system IS 20 may be performed by more, fewer, or other modules. Additionally, operations of IS 20 may be performed using any suitable logic.

Figure 4:
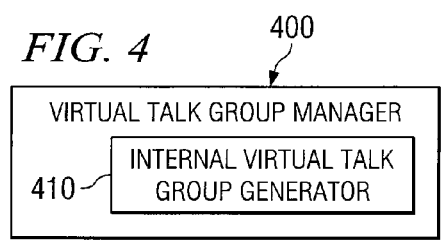
FIG. 4 illustrates an example virtual talk group manager that may be used with the interoperability system of FIG. 3, in accordance with a particular embodiment.

FIG. 4 illustrates an example virtual talk group manager 400, in accordance with a particular embodiment. Virtual talk group manager 400 may cooperate with or may be included in any suitable device, for example, IS 20 or endpoint 22, 80, or 90. Virtual talk group manager 400 may manage virtual talk groups $VTG_i$, where a virtual talk group $VTG_i$ has n members given by $m(VTG_i)=\{m_{i1}, \ldots m_{ij}, \ldots, m_{in}\}$.

According to the illustrated embodiment, virtual talk group manager 400 includes an internal virtual talk group generator 410. Internal virtual talk group generator 410 creates corresponding internal virtual talk groups $VTG_i^*$ from virtual talk groups $VTG_i$. A set of internal virtual talk groups $VTG_i^*$ that correspond to a set of virtual talk groups $VTG_i$ typically includes the same members. The members of the internal virtual talk groups $VTG_i^*$, however, are distributed among the groups $VTG_i^*$ such that the groups $VTG_i^*$ have no overlapping members. Moreover, the members are distributed such that each virtual talk group $VTG_i$ has one or more corresponding internal virtual talk groups $VTG_i^*$ that have the same members as the virtual talk group $VTG_i$.

The internal virtual talk groups may be created in any suitable manner. According to one embodiment, internal virtual talk groups may be created from first and second virtual talk groups that have an overlapping member. A first internal virtual talk group may be created by removing the overlapping member from the first virtual talk group. A second internal virtual talk group may be created by removing the overlapping member from the second virtual talk group. A third internal virtual talk group may be created from the overlapping member.

As an example, internal virtual talk groups $VTG_i^*$ may be created from virtual talk groups $VTG_1$ and $VTG_2$ that have an overlapping member $m_{1j}=m_{2j'}$. Internal virtual talk group $VTG_1^*$ may be created by removing overlapping member $m_{1j}$ from the first virtual talk group $VTG_1$:

$$m(VTG^*_1)=\{m_{11}, \ldots, m_{1p}\}-\{m_{1j}\}$$

Second internal virtual talk group $VTG^*_2$ may be created by removing overlapping member $m_{2j'}$ from second virtual talk group $VTG_2$:

$$m(VTG^*_2)=\{m_{21}, \ldots, m_{2q}\}-\{m_{2j'}\}$$

Third internal virtual talk $VTG^*_{1,2}$ group may be created from overlapping member $m_{1j}$:

$$m(VTG^*_{1,2})=\{m_{1j}\}=\{m_{2j'}\}$$

An endpoint subscribing to a virtual talk group is instructed to listen to the internal virtual talk groups corresponding to the virtual talk group. In the example, virtual talk group $VTG_1$ has corresponding internal virtual talk groups $VTG_1^*$ and $VTG_{1,2}^*$, and virtual talk group $VTG_2$ has corresponding internal virtual talk groups $VTG_2^*$ and $VTG_{1,2}^*$. Since the internal virtual talk groups do not have any overlapping members, the endpoint receives only one stream from each source.

In accordance with one embodiment, when a dispatcher creates $VTG_3$ by combining $VTG_1$ and $VTG_2$, members of $VTG_3$ receive the combined media streams from $VTG^*_1$, $VTG^*_2$, and $VTG^*_{1,2}$, thus avoiding hearing multiple media streams from the overlapping member $m_{1j}$.

Modifications, additions, or omissions may be made to virtual talk group manager 400 without departing from the scope of the invention. The components of virtual talk group manager 400 may be integrated or separated according to particular needs. Moreover, the operations of virtual talk group manager 400 may be performed by more, fewer, or other modules. Additionally, operations of virtual talk group manager 400 may be performed using any suitable logic.

Figure 5A:
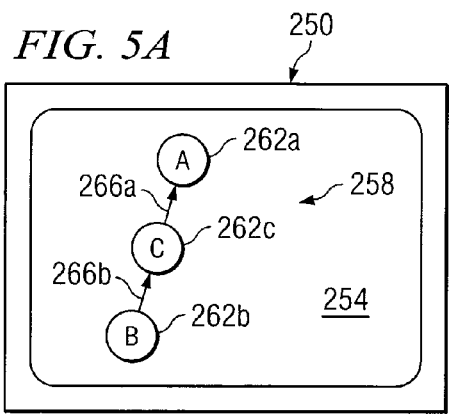
FIGS. 5A and 5B illustrate an example user interface for creating virtual talk groups that may be used with the interoperability system of FIG. 3, in accordance with a particular embodiment.
Figure 5B:
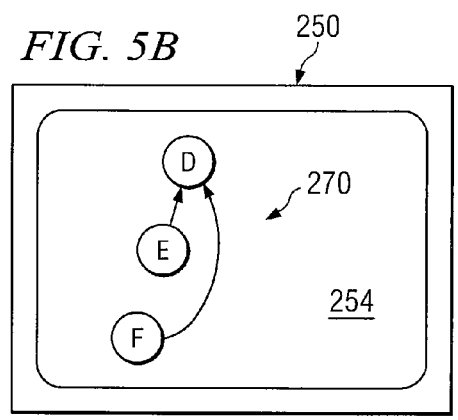

FIGS. 5A and 5B illustrate an example user interface 250 for creating virtual talk groups, in accordance with a particular embodiment. User interface 250 may be used with any suitable device, for example, IS 20 or endpoints 22, 80, or 90, to facilitate creation and management of virtual talk groups. The graphs of the virtual talk groups may be maintained as a live in-memory synchronized data structure for the device.

User interface 250 includes a window 254. A user may configure a virtual talk group by dragging and dropping graphical elements representing channels and members into an area representing the virtual talk group. Moreover, a user may link virtual talk groups by coupling graphical elements representing the virtual talk groups with a graphical link. User interface 250 may allow a user to perform other suitable operations, for example, to configure group details such as name, description, participants, multicast IP addresses, codec, and latch options.

Referring to FIG. 5A, window 254 includes a graph 258 representing relationships among virtual talk groups. Graph 258 includes nodes 262 and links 266. A node 262 represents a virtual talk group. Nodes 262a, 262b, 262c represent virtual talk groups A, B, and C, respectively.

A link 266 represents a relationship between virtual talk groups. In the illustrated embodiment, link 266 comprises an arrow from a child virtual talk group, or sub-group, to a parent virtual talk group. In the illustrated embodiment, virtual talk group B is a sub-group of virtual talk group C, and virtual talk group C is a sub-group of virtual talk group A.

Links 266 form paths between virtual talk groups. A path between virtual talk groups may be direct or indirect. A direct path between two virtual talk groups has no intervening virtual talk groups. As an example, the path between virtual talk groups B and C is direct, and the path between virtual talk groups C and A is direct. An indirect path between two virtual talk groups has one or more intervening virtual talk groups. In the illustrated example, the path between virtual talk groups B and A is indirect because there is an intervening virtual talk group C.

Referring to FIG. 5B, graph 270 illustrates another relationship between virtual talk groups D, E, and F. Virtual talk group E is a sub-group of virtual talk group D, and virtual talk group F is a sub-group of virtual talk group D.

According to one embodiment, IS 20 may detect whether a link to be formed between virtual talk groups would result in a loop. A loop may be detected in any suitable manner. In one example, IS 20 may determine whether a link to be formed between virtual talk groups A and B of a set of virtual talk groups would yield a loop by establishing if either of the following criteria is satisfied:

(1) whether another path (either direct or indirect) between virtual talk groups A and B already exists; and (2) whether linking virtual talk groups A and B would create multiple paths between any two or more virtual talk groups of the set of virtual talk groups. If either or both of these conditions are satisfied, adding the link between virtual talk groups A and B would yield a loop.

As an example, in graph 258, there is a path between virtual talk groups A and B, so adding a link between virtual talk groups A and B would violate the first condition, and thus yield a loop. As another example, in graph 270, adding a link between virtual talk groups E and F would create multiple paths between virtual talk groups F and D, violating the second condition, and thus yield a loop.

IS 20 may respond to the detection of a loop in any suitable manner. According to one embodiment, IS 20 may prevent the addition of a link that would result in a loop, for example, prevent the addition if either of the conditions is satisfied. As an example, the user may be prevented from placing the link between the virtual talk groups.

According to another embodiment, IS 20 may provide a notification if a loop is detected, for example, if either of the conditions is satisfied. The notification may be presented in any suitable manner. As an example, an alert window may notify the user of the loop. As another example, the link that results in the loop may be highlighted, for example, displayed in a different color such as red.

Modifications, additions, or omissions may be made to user interface 250 without departing from the scope of the invention. User interface 250 may include more, fewer, or other graphical elements. Additionally, graphical elements may be configured in any suitable arrangement without departing from the scope of the invention.

Figure 6:
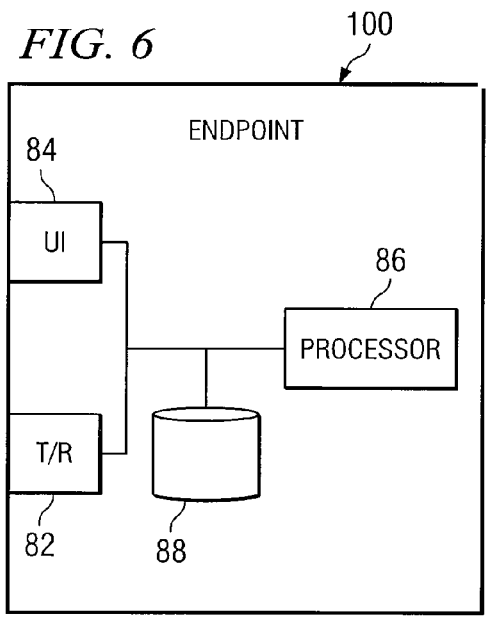
FIG. 6 illustrates an example endpoint that may be used with the system of FIG. 2, in accordance with a particular embodiment.

FIG. 6 illustrates an endpoint 100, in accordance with a particular embodiment. Endpoint 100 may represent any suitable device or system of devices operable to provide communication services to a user, and may be substantially similar to endpoints 22 of FIG. 1 or endpoints 80 and 90 of FIG. 2.

Endpoint 100 includes a transmitter/receiver 82, a user interface 84, a processor 86, and a memory module 88. Transmitter/receiver 82 transmits and receives signals that communicate information to and from other network components.

User interface 84 provides a mechanism through which a user of endpoint 100 may operate endpoint 100 and communicate with other network devices. User interface 84 may comprise, for example, a microphone, a speaker, a keypad, a display, or any other suitable interface. Instructions may be submitted through speech, keystrokes, soft keystrokes, or other mechanism. According to one embodiment, user interface 84 includes a microphone operable to record an announcement for a user, and a speaker operable to play an announcement for a user. An example user interface 84 is described with reference to FIG. 5.

Processor 86 may comprise a processor operable to facilitate operation of endpoint 100. Memory module 88 may comprise memory operable to store information for endpoint 80. An example user interface is described in more detail with reference to FIG. 8.

Modifications, additions, or omissions may be made to endpoint 100 without departing from the scope of the invention. The components of endpoint 100 may be integrated or separated according to particular needs. Moreover, the operations of endpoint 100 may be performed by more, fewer, or other modules. Additionally, operations of endpoint 100 may be performed using any suitable logic.

Figure 7:
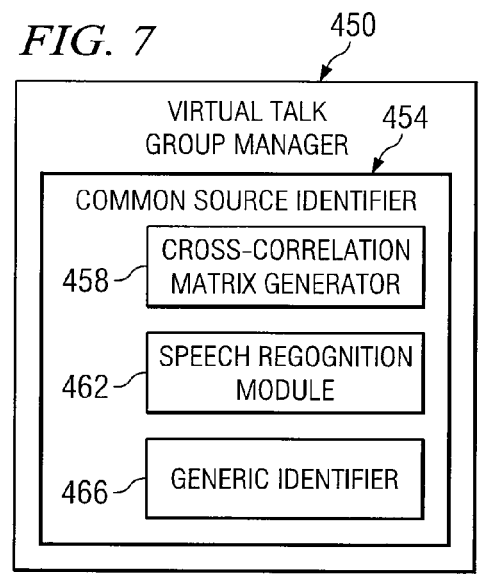
FIG. 7 illustrates another example virtual talk group manager that may be used with the endpoint of FIG. 6, in accordance with a particular embodiment.

FIG. 7 illustrates an example virtual talk group manager 450, in accordance with a particular embodiment. Virtual talk group manager 450 may cooperate with or may be included in any suitable device endpoint 22, 80, or 90 or IS 20.

According to the illustrated embodiment, virtual talk group manager 450 includes a common source identifier 454 that identifies streams arriving from a common source, such as the same endpoint. If streams have a common source, virtual talk group manager 450 may drop a subset of the streams, for example, all but one stream arriving from the same source. The remaining streams may then be mixed.

Common source identifier 454 may identify streams from a common source in any suitable manner. According to the illustrated embodiment, common source identifier 454 may include a cross-correlation matrix generator 458, a speech recognition module 462, a generic identifier 466, or any suitable combination of the preceding to identify streams from a common source. Cross-correlation matrix generator 458 may calculate a cross-correlation matrix for the streams. Streams that have a high correlation may indicate streams from a common source, and streams with low correlation may indicate streams from different sources. Accordingly, virtual talk group manager 450 may drop all but one of a group of highly correlated streams, and may mix the resulting low correlated streams.

The cross-correlation matrix may be calculated at any suitable time. According to one embodiment, the matrix may be calculated in response to a push-to-talk event. Example push-to-talk events that may trigger computation may include when the user pushes a talk button in order to request floor control.

Speech recognition module 462 may identify streams from a common source using a speech recognition operation. Streams from a common source typically have similar speech characteristics, such as similar speech envelopes. As an example, a speech envelope detection operation may be used to detect the envelopes of the streams, and correlation techniques may be used to determine if the envelopes match.

Generic identifier 466 may identify streams from a common source using the headers of packets carrying the media streams. As an example, the headers include source addresses identifying the sources of the streams. Headers with common source addresses indicate streams from a common source.

Modifications, additions, or omissions may be made to virtual talk group manager 450 without departing from the scope of the invention. The components of virtual talk group manager 450 may be integrated or separated according to particular needs. Moreover, the operations of virtual talk group manager 450 may be performed by more, fewer, or other modules. Additionally, operations of virtual talk group manager 450 may be performed using any suitable logic.

Figure 8:
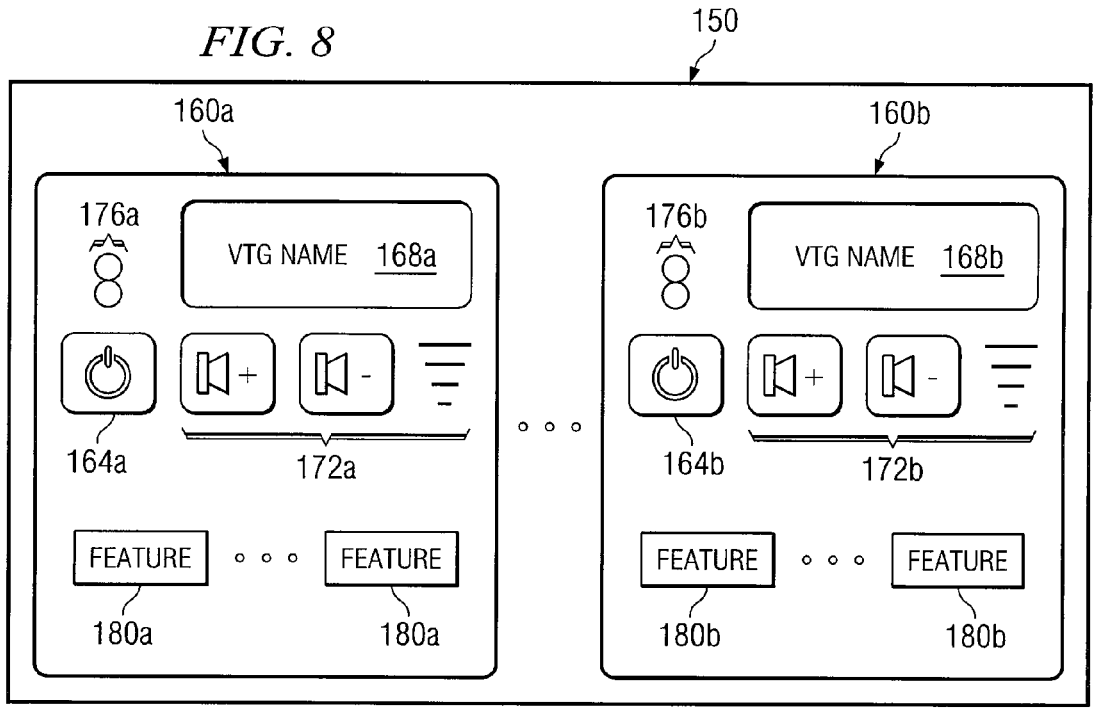
FIG. 8 illustrates an example endpoint user interface that may be used with the endpoint of FIG. 6, in accordance with a particular embodiment.

FIG. 8 illustrates an example endpoint user interface 150, in accordance with a particular embodiment. User interface 150 may be used with endpoint 100 of FIG. 6 to select and manage participation in virtual talk groups.

User interface 150 includes one or more group sections 160. A group section 160 may correspond to a virtual talk group, and may be used to manage participation in the virtual talk group. A group section 160 for a virtual talk group includes an activation/deactivation selector 164, a push-to-talk button 168, volume controls 172, transmit and receive indicators 176, and feature controls 180.

Activation/deactivation selector 164 may be used to activate or deactivate a channel to, for example, join or leave the virtual talk group. Push-to-talk button 168 may be used to request floor control from IS 20 in order to be able to send streams to other members of the virtual talk group. Push-to-talk button 168 may be selected to request floor control by, for example, pushing the button, and may be deselected to relinquish floor control by, for example, releasing the button. According to the illustrated embodiment, push-to-talk button 168 displays the name of the virtual talk group.

Volume controls 172 may be used to increase or decrease the volume from the virtual talk group. A volume control 172 may include an indicator that indicates the volume level of the channel. Transmit and receive indicators 176 may indicate whether traffic is being transmitted and/or received. According to one embodiment, indicators 176 for the virtual talk groups to which an endpoint is a member may be simultaneously activated when receiving the stream from the endpoint.

Feature controls 180 may be used to activate or deactivate features of a virtual talk group. For example, a feature button may add video communication among members of a virtual talk group, while another feature button may invoke recording of audio communication among the members of the virtual talk group.

Modifications, additions, or omissions may be made to user interface 150 without departing from the scope of the invention. User interface 150 may include more, fewer, or other graphical elements. Additionally, graphical elements may be configured in any suitable arrangement without departing from the scope of the invention.

Certain embodiments of the invention may provide one or more technical advantages. A technical advantage of one embodiment may be that internal virtual talk groups that avoid overlapping members, that is, members of two or more virtual talk groups, may be created. An endpoint may use the internal virtual talk groups to avoid receiving streams from a common source, which may in turn avoid undesired echo resulting from mixing streams from a common source.

Another technical advantage of one embodiment may be that an endpoint may identify streams arriving from a common source, and may drop all but one of the streams. The endpoint may identify the streams according to a cross-correlation matrix, a speech recognition operation, or the headers of packets carrying the media streams.

Another technical advantage of one embodiment may be that a user interface for creating and managing virtual talk groups may be used to reduce or eliminate the possibility of creating loops through which a stream originating from an endpoint travels back to the endpoint. A stream traveling through the loop may create undesired feedback noise.

Technical advantages of particular embodiments include managing the capabilities of an endpoint by determining whether an endpoint has sufficient resources to participate in virtual talk groups that may be accessed by the endpoint, and establishing at least a subset of the virtual talk groups that may be presented to the endpoint if it does not have sufficient resources.

In addition, in particular embodiments, the subset of virtual talk groups may be established by presenting options that may be selected to either increase the resources or reduce the demand. The virtual talk groups may be selected in accordance with the selections.

While various implementations and features are discussed with respect to multiple embodiments, it should be understood that such implementations and features may be combined in various embodiments. For example, features and functionality discussed with respect to a particular figure may be used in connection with features and functionality discussed with respect to another figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged, or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations, and modifications may be ascertained by those skilled in the art. The present invention encompasses all such changes, substitutions, variations, alterations, and modifications as falling within the spirit and scope of the appended claims.

What is claimed is:

1. A method for providing a plurality of virtual talk groups to an endpoint, comprising:
  managing a plurality of original virtual talk groups, a virtual talk group of the plurality of original virtual talk groups comprising one or more members operable to participate in the virtual talk group;
  identifying one or more overlapping members, an overlapping member being a member of more than one virtual talk group;
  generating a plurality of internal virtual talk groups from the plurality of original virtual talk groups, the internal virtual talk groups comprising at least a reduced number of overlapping members; and
  providing one or more original virtual talk groups of the plurality of original virtual talk groups to an endpoint using the internal virtual talk groups.

2. The method of claim 1, wherein generating the plurality of internal virtual talk groups from the plurality of original virtual talk groups further comprises:
  generating the plurality of internal virtual talk groups from a first original virtual talk group and a second original virtual talk group of the plurality of original virtual talk groups, the first original virtual talk group and the second original virtual talk group comprising the one or more of the overlapping members, the plurality of internal virtual talk groups created by:
    generating a first internal virtual talk group by removing the one or more overlapping members from the first original virtual talk group;
    generating a second internal virtual talk group by removing the one or more overlapping members from the second original virtual talk group; and
    generating a third internal virtual talk group comprising the one or more of the overlapping members.

3. The method of claim 1, wherein providing the one or more original virtual talk groups of the plurality of original virtual talk groups to the endpoint using the internal virtual talk groups further comprises:
  identifying one or more internal virtual talk groups that correspond to the one or more original virtual talk groups, the one or more identified internal virtual talk groups having substantially the same members as the one or more original virtual talk groups; and
  instructing the endpoint to receive one or more streams from the one or more identified internal virtual talk groups.

4. The method of claim 1, wherein providing the one or more original virtual talk groups of the plurality of original virtual talk groups to the endpoint using the internal virtual talk groups further comprises:
  identifying one or more internal virtual talk groups that correspond to the one or more original virtual talk groups, the one or more identified internal virtual talk groups having substantially the same members as the one or more original virtual talk groups;
  mixing one or more streams from the one or more identified internal virtual talk groups; and
  sending the mixed one or more streams to the endpoint.

5. A system for providing a plurality of virtual talk groups to an endpoint, comprising:
  a memory operable to store information about a plurality of original virtual talk groups, a virtual talk group of the plurality of original virtual talk groups comprising one or more members operable to participate in the virtual talk group; and
  one or more processors coupled to the memory and operable to:
    identify one or more overlapping members, an overlapping member being a member of more than one virtual talk group;
    generate a plurality of internal virtual talk groups from the plurality of original virtual talk groups, the internal virtual talk groups comprising at least a reduced number of overlapping members; and
    provide one or more original virtual talk groups of the plurality of original virtual talk groups to an endpoint using the internal virtual talk groups.

6. The system of claim 5, the one or more processors further operable to generate the plurality of internal virtual talk groups from the plurality of original virtual talk groups by:
  generating the plurality of internal virtual talk groups from a first original virtual talk group and a second original virtual talk group of the plurality of original virtual talk groups, the first original virtual talk group and the second original virtual talk group comprising the one or more of the overlapping members, the plurality of internal virtual talk groups created by:
    generating a first internal virtual talk group by removing the one or more overlapping members from the first original virtual talk group;
    generating a second internal virtual talk group by removing the one or more overlapping members from the second original virtual talk group; and
    generating a third internal virtual talk group comprising the one or more of the overlapping members.

7. The system of claim 5, the one or more processors further operable to provide the one or more original virtual talk groups of the plurality of original virtual talk groups to the endpoint using the internal virtual talk groups by:
  identifying one or more internal virtual talk groups that correspond to the one or more original virtual talk groups, the one or more identified internal virtual talk groups having substantially the same members as the one or more original virtual talk groups; and
  instructing the endpoint to receive one or more streams from the one or more identified internal virtual talk groups.

8. The system of claim 5, the one or more processors further operable to provide the one or more original virtual talk groups of the plurality of original virtual talk groups to the endpoint using the internal virtual talk groups by:
  identifying one or more internal virtual talk groups that correspond to the one or more original virtual talk groups, the one or more identified internal virtual talk groups having substantially the same members as the one or more original virtual talk groups;
  mixing one or more streams from the one or more identified internal virtual talk groups; and
  sending the mixed one or more streams to the endpoint.

9. The system of claim 5, the one or more processors further operable to:
  generate the plurality of internal virtual talk groups from the plurality of original virtual talk groups by:
    generating the plurality of internal virtual talk groups from a first original virtual talk group and a second original virtual talk group of the plurality of original virtual talk groups, the first original virtual talk group and the second original virtual talk group comprising the one or more of the overlapping members, the plurality of internal virtual talk groups created by:
      generating a first internal virtual talk group by removing the one or more overlapping members from the first original virtual talk group;
      generating a second internal virtual talk group by removing the one or more overlapping members from the second original virtual talk group; and
      generating a third internal virtual talk group comprising the one or more of the overlapping members; and
  provide the one or more original virtual talk groups of the plurality of original virtual talk groups to the endpoint using the internal virtual talk groups by:
    identifying one or more internal virtual talk groups that correspond to the one or more original virtual talk groups, the one or more identified internal virtual talk groups having substantially the same members as the one or more original virtual talk groups;
    instructing the endpoint to receive one or more streams from the one or more identified internal virtual talk groups;
    mixing one or more streams from the one or more identified internal virtual talk groups; and
    sending the mixed one or more streams to the endpoint.

10. A system for providing a plurality of virtual talk groups to an endpoint, comprising:
  means for managing a plurality of original virtual talk groups, a virtual talk group of the plurality of original virtual talk groups comprising one or more members operable to participate in the virtual talk group;
  means for identifying one or more overlapping members, an overlapping member being a member of more than one virtual talk group;
  means for generating a plurality of internal virtual talk groups from the plurality of original virtual talk groups, the internal virtual talk groups comprising at least a reduced number of overlapping members; and
  means for providing one or more original virtual talk groups of the plurality of original virtual talk groups to an endpoint using the internal virtual talk groups.

11. A method for facilitating a plurality of virtual talk groups, comprising:
  receiving a plurality of streams from a plurality of sources of a plurality of members of one or more virtual talk groups;
  identifying two or more streams received from a common source of the plurality of sources;
  dropping a subset of the identified streams; and
  mixing the remaining streams.

12. The method of claim 11, wherein identifying two or more streams received from the common source of the plurality of sources further comprises:
  calculating a cross-correlation matrix of the plurality of streams;
  identifying two or more streams that are highly correlated according to the cross-correlation matrix; and
  identifying the two or more highly correlated streams as received from the common source.

13. The method of claim 11, wherein identifying two or more streams received from the common source of the plurality of sources further comprises:

applying a speech recognition operation to the plurality of streams;
identifying two or more streams that have substantially similar speech characteristics according to the speech recognition operation; and
identifying the two or more streams as received from the common source.

14. The method of claim 11, wherein identifying two or more streams received from the common source of the plurality of sources further comprises:
examining a plurality of headers of a plurality of packets of the plurality of streams; and
identifying the two or more streams according to the plurality of headers.

15. The method of claim 11, wherein identifying two or more streams received from the common source of the plurality of sources further comprises:
identifying the two or more streams in response to a push-to-talk event.

16. A system for facilitating a plurality of virtual talk groups, comprising:
an interface operable to:
receive a plurality of streams from a plurality of sources of a plurality of members of one or more virtual talk groups; and
one or more processors coupled to the interface and operable to:
identify two or more streams received from a common source of the plurality of sources;
drop a subset of the identified streams; and
mix the remaining streams.

17. The system of claim 16, the one or more processors further operable to identify two or more streams received from the common source of the plurality of sources by:
calculating a cross-correlation matrix of the plurality of streams;
identifying two or more streams that are highly correlated according to the cross-correlation matrix; and
identifying the two or more highly correlated streams as received from the common source.

18. The system of claim 16, the one or more processors further operable to identify two or more streams received from the common source of the plurality of sources by:
applying a speech recognition operation to the plurality of streams;
identifying two or more streams that have substantially similar speech characteristics according to the speech recognition operation; and
identifying the two or more streams as received from the common source.

19. The system of claim 16, the one or more processors further operable to identify two or more streams received from the common source of the plurality of sources by:
examining a plurality of headers of a plurality of packets of the plurality of streams; and
identifying the two or more streams according to the plurality of headers.

20. The system of claim 16, the one or more processors further operable to identify two or more streams received from the common source of the plurality of sources by:
identifying the two or more streams in response to a push-to-talk event.

21. The system of claim 16, the one or more processors further operable to identify two or more streams received from the common source of the plurality of sources by:
calculating a cross-correlation matrix of the plurality of streams;
identifying two or more streams that are highly correlated according to the cross-correlation matrix;
identifying the two or more highly correlated streams as received from the common source;
applying a speech recognition operation to the plurality of streams;
identifying two or more streams that have substantially similar speech characteristics according to the speech recognition operation;
identifying the two or more streams as received from the common source;
identifying the two or more streams in response to a push-to-talk event;
examining a plurality of headers of a plurality of packets of the plurality of streams; and
identifying the two or more streams according to the plurality of headers.

22. A system for facilitating a plurality of virtual talk groups, comprising:
means for receiving a plurality of streams from a plurality of sources of a plurality of members of one or more virtual talk groups;
means for identifying two or more streams received from a common source of the plurality of sources;
means for dropping a subset of the identified streams; and
means for mixing the remaining streams.

23. A method for managing a plurality of virtual talk groups, comprising:
accessing information describing one or more links among a plurality of virtual talk groups, at least some of the plurality of virtual talk groups linked by the one or more links;
considering a link between a first virtual talk group and a second virtual talk group of the plurality of virtual talk groups;
determining whether the considered link would yield a loop among at least a subset of the plurality of virtual talk groups; and
performing a response if the considered link would yield the loop.

24. The method of claim 23, wherein determining whether the considered link would yield the loop among at least the subset of the plurality of virtual talk groups further comprises:
establishing whether there is an existing link between the first virtual talk group and the second virtual talk group; and
determining that the considered link would yield the loop if there is the existing link.

25. The method of claim 23, wherein determining whether the considered link would yield the loop among at least the subset of the plurality of virtual talk groups further comprises:
establishing whether the considered link would yield two or more paths between any two or more virtual talk groups of the plurality of talk groups; and
determining that the considered link would yield the loop if the considered link would yield the two or more paths.

26. The method of claim 23, further comprising:
displaying the one or more relationships by a graph representing the one or more relationships, the graph comprising:
a plurality of graphical node elements, each graphical node element representing a virtual talk group of the plurality of virtual talk groups; and
one or more graphical link elements, each graphical link element representing a link of the one or more links.

27. The method of claim 23, wherein performing the response if the considered link would yield the loop further comprises:
preventing creation of the considered link if the considered link would yield the loop.

28. The method of claim 23, wherein performing the response if the considered link would yield the loop further comprises:
providing a notification if the considered link would yield the loop.

29. A system for managing a plurality of virtual talk groups, comprising:
a memory operable to:
store information describing one or more links among a plurality of virtual talk groups, at least some of the plurality of virtual talk groups linked by the one or more links; and
one or more processors coupled to the memory and operable to:
consider a link between a first virtual talk group and a second virtual talk group of the plurality of virtual talk groups;
determine whether the considered link would yield a loop among at least a subset of the plurality of virtual talk groups; and
perform a response if the considered link would yield the loop.

30. The system of claim 29, the one or more processors further operable to determine whether the considered link would yield the loop by:
establishing whether there is an existing link between the first virtual talk group and the second virtual talk group; and
determining that the considered link would yield the loop if there is the existing link.

31. The system of claim 29, the one or more processors further operable to determine whether the considered link would yield the loop by:
establishing whether the considered link would yield two or more paths between any two or more virtual talk groups of the plurality of talk groups; and
determining that the considered link would yield the loop if the considered link would yield the two or more paths.

32. The system of claim 29, the one or more processors further operable to:
display the one or more relationships by a graph representing the one or more relationships, the graph comprising:
a plurality of graphical node elements, each graphical node element representing a virtual talk group of the plurality of virtual talk groups; and
one or more graphical link elements, each graphical link element representing a link of the one or more links.

33. The system of claim 29, the one or more processors further operable to perform the response by:
preventing creation of the considered link if the considered link would yield the loop.

34. The system of claim 29, the one or more processors further operable to perform the response by:
providing a notification if the considered link would yield the loop.

35. The system of claim 29, the one or more processors further operable to:
display the one or more relationships by a graph representing the one or more relationships, the graph comprising:
a plurality of graphical node elements, each graphical node element representing a virtual talk group of the plurality of virtual talk groups; and
one or more graphical link elements, each graphical link element representing a link of the one or more links;
determine whether the considered link would yield the loop by:
establishing whether there is an existing link between the first virtual talk group and the second virtual talk group;
determining that the considered link would yield the loop if there is the existing link;
establishing whether the considered link would yield two or more paths between any two or more virtual talk groups of the plurality of talk groups; and
determining that the considered link would yield the loop if the considered link would yield the two or more paths; and
perform the response by:
preventing creation of the considered link if the considered link would yield the loop; and
providing a notification if the considered link would yield the loop.

36. A system for managing a plurality of virtual talk groups, comprising:
means for accessing information describing one or more links among a plurality of virtual talk groups, at least some of the plurality of virtual talk groups linked by the one or more links;
means for considering a link between a first virtual talk group and a second virtual talk group of the plurality of virtual talk groups;
means for determining whether the considered link would yield a loop among at least a subset of the plurality of virtual talk groups; and
means for performing a response if the considered link would yield the loop.

37. A system for facilitation a plurality of virtual talk groups to an endpoint, comprising:
a first system for providing a plurality of virtual talk groups to an endpoint, comprising:
a first memory operable to store information about a plurality of original virtual talk groups, a virtual talk group of the plurality of original virtual talk groups comprising one or more members operable to participate in the virtual talk group; and
one or more first processors coupled to the first memory and operable to:
identify one or more overlapping members, an overlapping member being a member of more than one virtual talk group;
generate a plurality of internal virtual talk groups from the plurality of original virtual talk groups, the internal virtual talk groups comprising at least a reduced number of overlapping members, generating the plurality of internal virtual talk groups from the plurality of original virtual talk groups further comprising:
generating the plurality of internal virtual talk groups from a first original virtual talk group and a second original virtual talk group of the plurality of original virtual talk groups, the first original virtual talk group and the second original virtual talk group comprising the one or more of the overlapping members, the plurality of internal virtual talk groups created by:
generating a first internal virtual talk group by removing the one or more overlapping members from the first original virtual talk group;

generating a second internal virtual talk group by removing the one or more overlapping members from the second original virtual talk group; and
generating a third internal virtual talk group comprising the one or more of the overlapping members; and
provide one or more original virtual talk groups of the plurality of original virtual talk groups to an endpoint using the internal virtual talk groups by:
identifying one or more internal virtual talk groups that correspond to the one or more original virtual talk groups, the one or more identified internal virtual talk groups having substantially the same members as the one or more original virtual talk groups;
instructing the endpoint to receive one or more streams from the one or more identified internal virtual talk groups;
mixing one or more streams from the one or more identified internal virtual talk groups; and
sending the mixed one or more streams to the endpoint;
a second system for facilitating the plurality of virtual talk groups, comprising:
an interface operable to:
receive a plurality of streams from a plurality of sources of a plurality of members of one or more virtual talk groups; and
one or more second processors coupled to the interface and operable to:
identify two or more streams received from a common source of the plurality of sources by:
calculating a cross-correlation matrix of the plurality of streams;
identifying two or more streams that are highly correlated according to the cross-correlation matrix;
identifying the two or more highly correlated streams as received from the common source;
applying a speech recognition operation to the plurality of streams;
identifying two or more streams that have substantially similar speech characteristics according to the speech recognition operation;
identifying the two or more streams as received from the common source;
identifying the two or more streams in response to a push-to-talk event;
examining a plurality of headers of a plurality of packets of the plurality of streams; and
identifying the two or more streams according to the plurality of headers;
drop a subset of the identified streams; and
mix the remaining streams; and
a third system for managing the plurality of virtual talk groups, comprising:
a third memory operable to:
store information describing one or more links among a plurality of virtual talk groups, at least some of the plurality of virtual talk groups linked by the one or more links; and
one or more third processors coupled to the third memory and operable to:
display the one or more relationships by a graph representing the one or more relationships, the graph comprising:
a plurality of graphical node elements, each graphical node element representing a virtual talk group of the plurality of virtual talk groups; and
one or more graphical link elements, each graphical link element representing a link of the one or more links;
consider a link between a first virtual talk group and a second virtual talk group of the plurality of virtual talk groups;
determine whether the considered link would yield a loop among at least a subset of the plurality of virtual talk groups by:
establishing whether there is an existing link between the first virtual talk group and the second virtual talk group;
determining that the considered link would yield the loop if there is the existing link;
establishing whether the considered link would yield two or more paths between any two or more virtual talk groups of the plurality of talk groups; and
determining that the considered link would yield the loop if the considered link would yield the two or more paths; and
perform a response if the considered link would yield the loop by:
preventing creation of the considered link if the considered link would yield the loop; and
providing a notification if the considered link would yield the loop.

* * * * *